United States Patent [19]
Pavey

[11] 3,914,445
[45] Oct. 21, 1975

[54] INTERMEDIATE MOISTURE FORMULATED FOODS AND PROCESS
[75] Inventor: Robert L. Pavey, Western Springs, Ill.
[73] Assignee: Swift & Company, Chicago, Ill.
[22] Filed: June 10, 1974
[21] Appl. No.: 477,589

[52] U.S. Cl. ............... 426/326; 426/532; 426/331; 426/335; 426/558; 426/614; 426/641
[51] Int. Cl. ..................... A22c 18/00; A23l 3/00
[58] Field of Search .......... 426/151, 155, 157, 159, 426/227, 283, 326, 331, 335, 342, 344, 413

[56] References Cited
UNITED STATES PATENTS

| | | | |
|---|---|---|---|
| 3,294,547 | 12/1966 | Kooistra | 426/157 |
| 3,492,127 | 1/1970 | Ketch et al. | 426/283 |
| 3,634,104 | 1/1972 | Kaplow et al. | 426/151 |
| 3,732,112 | 5/1973 | Frankenfeld et al. | 426/151 |
| 3,753,734 | 8/1973 | Kaplow et al. | 426/151 |
| 3,769,042 | 10/1973 | Kaplow et al. | 426/326 |

Primary Examiner—Hyman Lord
Attorney, Agent, or Firm—Edward T. McCabe; Charles E. Bouton; W. C. Davis

[57] ABSTRACT

Formulated shelf-stable food compositions within the intermediate moisture range are prepared by adding 3–8% edible humectants, e.g. glycerol to the original product formulation, cooking and further reducing the amount of available water $A_w$ to a desired level of from about 0.80 to about 0.85 by vacuum drying.

7 Claims, No Drawings

INTERMEDIATE MOISTURE FORMULATED FOODS AND PROCESS

The invention herein described was made in the course of or under a contract, or subcontract thereunder, with the Department of Defense.

The present invention relates to improved ready-to-eat intermediate moisture formulated food compositions and to an improved process for manufacturing same.

Intermediate moisture foods generally relate to foods resembling dry foods in their resistance to microbial deterioration without refrigeration but differ in that they contain too much moisture, normally 15–30%, to be regarded as dry foods. They also are plastic or are easily masticated and do not produce an oral sensation of dryness. "Osmotic pressure preservation" is a principle on which the concept of intermediate foods is based and involves chemical binding of the water present to a point where it becomes unavailable for microbial growth. The binding, immobilization and other types of restraint imposed on the behavior of water present in foods is mediated by a multiplicity of systemic factors such as the nature and concentration of dissolved components, the number and binding capacity of polar residues including those with negative coefficients, the configuration of hydrophobic and hydrophilic areas, and, presumably, the mechanisms which alter the structure of water itself.

The availability of water for spore germination and microbial growth is closely related to its relative vapor pressure, commonly designated as water activity of $A_w$. Water activity $A_w$ is defined as the ratio of vapor pressure (P) of water in the food to the vapor pressure of pure water ($P_0$) at the same temperature, that is, $A_w=P/P_0$. Within the range favorable to the growth of mesophilic microorganisms, $A_w$ is practically independent of temperature.

As a convenient generalization, the water activity or $A_w$ can be regarded as an index to the "availability" of water for vital processes incident to microbial growth. For example, spores cannot germinate and relatively few species of bacteria, including only one food pathogen, can multiply at $A_w=0.90$. However, under favorable conditions Staphylococcus aureas has been observed to grow at $A_w$ as low as 0.86. Halophilic bacteria may grow at $A_w$ as low as 0.75, which corresponds to a saturated solution of sodium chloride. The common species of yeast and mold are suppressed at $A_w$ 0.88 and 0.80, respectively, while the limits for xerophilic molds and osmophilic yeast are stated to be 0.65 and 0.60, respectively. Therefore, microbial stability can essentially be attained by developing food products having an active water $A_w$ level depressed to about 0.85 when combined with an effective antimycotic agent to suppress growth of yeast and mold.

It should be understood that, although glycerol is employed in the instant examples, those skilled in the art will recognize that a wide range of edible humectants well known in the art could be substituted therefor.

It is also recognized that the particular formulated food products set forth herein are merely illustrative of the wide range of such products to which the instant teachings are applicable.

In recent years considerable progress has been made in the development and refinement of intermediate moisture (IM) food products, particularly in view of the unprecedented demand for convenience foods generally, and particularly in such areas as shelf stable pet foods, foods for the armed forces, and foods for space travel. Recently the range of suitable humectants in the preparation of intermediate moisture foods has been significantly broadened as is exemplified by the patents to Finkenfeld et al., No. 3,732,112, issued May 8, 1973 and the patent to Kaplow et al., No. 3,753,734, issued Aug. 21, 1973. The basic concept in historical development of the effect of water activity $A_w$ on microbiological stability of intermediate moisture foods is incorporated into the patents to Kaplow et al., No. 3,769,042, issued Oct. 30, 1973, to Kooistra, Jr., No. 3,294,547, issued Dec. 27, 1966 and to Ketch et al., No. 3,492,127, issued Jan. 27, 1970.

The present invention relates to the discovery that commercially prepared ready-to-eat formulated food compositions are uniquely suited as intermediate moisture foods. For example, in the preparation of formulated foods, the direct addition of glycerol to the original product formulation prior to cooking is a simple procedure and avoids such problems as soak infusion for extended periods prior, during or after cooking. Injection of glycerol or glycerol solutions directly into raw or cooked products frequently results in poor distribution of the solutions as evidenced by pocketing of glycerol and by uneven weight gains. Artery pumping, such as with hams, proved unsatisfactory because of inability to control the internal glycerol solutions. Previous investigations have shown that a great variety of foods can easily be adjusted to the desired level of water activity by equilibration with an external solution containing a pre-determined concentration of glycerol. Such a procedure, however, does not permit control of the amount of glycerol solution remaining in the final product and experience has clearly demonstrated, particularly for formulated food compositions, that product acceptability as to both flavor and texture is significantly impaired by the concentration of humectants normally required to adjust the water activity $A_w$ to 0.85.

Accordingly, it is an object of the present invention to provide a process for producing a commercially attractive ready-to-eat intermediate formulated food product containing reduced amounts of humectants such as glycerol which are shelf-stable without being hermetically sealed or refrigerated.

It is another object of the present invention to provide a process which avoids such physical characteristics as variable concentrations of soluble solute to moisture within the product, surface dryness and hardness, and abnormal flavor such as excessive sweetness and/or sourness.

It is still another object of the present invention to provide a process for producing shelf-stable ready-to-eat formulated foods having a water activity $A_w$ of between about 0.80 to about 0.85, said process comprising adding an edible humectant such as glycerol in amounts of from about 3 to about 8% of the final formulation and vacuum drying the final product.

It is yet another object of the present invention to provide improved ready-to-eat foods requiring no rehydration and which offer improved flavor and physical characteristics.

It is another object of the present invention to provide fully cooked, ready-to-eat, intermediate food compositions such as pancakes, omelets, bologna and the like containing from about 3 to about 8% edible humectants.

The present invention relates to an improved method of preparing intermediate moisture ready-to-eat formulated food compositions containing reduced amounts of edible humectants such as glycerol. Specifically, the process involves conventional commercial preparation and processing for the respective formulated foods to which 3-8% glycerol has been added to the original uncooked formulation. Water activity is adjusted within the range of 0.80 to about 0.85 at 25°C. by the presence of an internal solution containing 3-8% glycerol in the prepared product and by vacuum drying. The final product may also contain normal amounts of sodium chloride, potassium sorbate (sorbic acid) not to exceed above about 0.2% by weight of the prepared product, and standard flavoring agents in appropriate amounts. The term "internal solution" designates the aqueous phase which is bound or otherwise retained by the tissue at 25°C. when subjected to a pressure of 2Ks/CM$^2$ for 5 minutes. Drying is accomplished by use of a vacuum at approximately 3 mm absolute pressure until a pre-determined amount of water is removed. This is accomplished by using chamber platen temperatures from ambient (22°C.) to 38°C. The partially dried ready-to-eat formulated products are sealed in non-hermetic packaging material such as cellophane pouches for storage. Evaluation of the stored food compositions after periods of from 3 to 24 months shows insignificant, if any, loss of internal solution, no apparent oxidation of fats, no detrimental degree of browning, no apparent moisture loss, no consequential changes in water activities, no significant microbial growth and no significant deterioration in texture or flavor.

Application of the above-described process is illustrated by the following examples. However, these examples are not intended to be limiting in any respect, and variations will be apparent to those skilled in the food processing art.

EXAMPLE I

| Ready-to-eat Pancakes<br>Final formulation: | Percentage |
|---|---|
| Pancake Mix (complete) | 50.00 |
| Water | 44.85 |
| Glycerol | 5.00 |
| Potassium Sorbate | .15 |
| | 100.00 |

It was found that complete pancake mixes or those not requiring the addition of milk, shortening and eggs were satisfactory and the simplest to control. Direct addition of glycerol to the product formulation was also found to be simplest and most satisfactory. The formulations were simply mixed, grilled in a conventional manner until cooked throughout, and thereafter vacuum dried to an $A_w$ of 0.80. The most desirable cooked weight was about 90.0% of the original formulation, and the most desirable vacuum dried weight was about 66.6% of the original formulation.

It will be understood by those skilled in the art of preparing such products that the incorporation of a vacuum drying step results in a substantial lowering of humectant levels over those heretofore taught in the art. For example, see Pat. No. 3,753,734 which teaches a humectant range of 20-35% of the pancake batter. The instant product exhibits a substantial reduction of humectants and results in a significantly improved product with a higher $A_w$ range of between 0.80 and 0.85.

EXAMPLE II

| Ready-to-eat Omelet<br>Final formulation: | Percentage |
|---|---|
| Egg | 76.4943 |
| Water | 18.5000 |
| Salt | 0.8500 |
| Pepper | 0.0057 |
| Glycerol | 4.0000 |
| Potassium Sorbate | 0.1500 |
| | 100.0000 |

As in Example I it was found to be easiest to incorporate the glycerol directly into the omelet mix prior to cooking. The omelets were cooked in Teflon-coated omelet skillets over a gas range until they started to set, and were then cooked under a broiler until done. The cooked omelets were then vacuum dried to an $A_w$ of about 0.83. The most desirable vacuum dried weight was about 47.8% of the cooked weight.

EXAMPLE III

| Bologna<br>Final formulation: | Percentage |
|---|---|
| Meat | 79.500 |
| Water (Ice) | 8.404 |
| Glycerol | 7.010 |
| Salt | 3.200 |
| Processed Mustard | 0.800 |
| Bologna Cure | 0.105 |
| Sodium Erythorbate | 0.035 |
| Bologna Seasoning | 0.670 |
| Garlic Powder | 0.006 |
| Liquid Smoke | 0.070 |
| Potassium Sorbate | 0.200 |
| | 100.000 |

It was found that glycerol could be added to the uncooked bologna formulations during chopping without affecting the binding properties of the product. The formulations were prepared in a manner identical to commercial processing of bologna. The final bologna product was sliced and vacuum dried to an $A_w$ of 0.83. The most desirable cooked weight was about 93.4% of the original formulation, and the most desirable vacuum dried weight was about 64.75% of the original formulation.

Glycerol is widely recognized as an excellent edible humectant. It is both economical and readily available, and it is generally considered representative of a broad range of such products. It will be understood that many other edible humectants are well known to those skilled in the art, as shown in the patents previously cited, which edible humectants also have utility in this invention.

The unique advantages of directing the teachings of the present invention to ready-to-eat formulated foods will be recognized by those skilled in the food processing art. The simple expedient of adding from 3-8% of a suitable humectant directly to the formulated food product, preparing the food in conformance with standard commercial practices, and thereafter subjecting the cooked product to a vacuum drying step, enables the processor to produce a novel product possessing an unobvious improvement in both texture and flavor. However, this is not to say that other applications of this inventive concept would not be obvious to those skilled in the food processing art, such as in the preparation of breads, cheese, casseroles, sandwiches, spreads and most other intermediate moisture foods. However, the preparation of these other types of IM foods usually involves special problems such as the addition of moisture to the product formulation and the uniform distribution of the humectant throughout all components of the product.

Although the present invention has been described and illustrated with references to specific examples, it will be understood that modifications and variations of the invention may be made without departing from the spirit and scope thereof, and therefore, only such limitations should be imposed as are indicated in the appended claims.

Obviously many modifications and variations of the invention as hereinbefore set forth may be made without departing from the spirit and scope thereof, and, therefore, only such limitations should be imposed as are indicated in the appended claims.

I claim:

1. A process for preparing ready-to-eat, shelf-stable formulated foods, comprising: adding an edible humectant to conventionally prepared food formulations in an amount of from about 3 to about 8% by weight of the final product; adding an effective level of an antimycotic to prevent mold growth; cooking the formulated product; and vacuum drying the cooked product to reduce the available water ($A_w$) to a desired intermediate moisture level of from about 0.80 to about 0.85.

2. The process of claim 1 wherein the humectant is glycerol and the antimycotic is potassium sorbate.

3. The process of claim 2 wherein the ready-to-eat formulated food is sealed in a non-hermetic package.

4. The process of claim 3 wherein the food formulation is an omelet.

5. The process of claim 3 wherein the food formulation is bologna.

6. The process of claim 3 wherein the food formulation is a pancake.

7. A cooked, vacuum dried, ready-to-eat food product as produced by the process of claim 1.

* * * * *